United States Patent [19]

Malavieille

[11] Patent Number: 4,662,962
[45] Date of Patent: May 5, 1987

[54] METHOD OF CONNECTING OPTICAL FIBERS

[75] Inventor: François-Louis Malavieille, Paris, France

[73] Assignee: Alliance Technique Industrielle, Evry, France

[21] Appl. No.: 636,738

[22] Filed: Aug. 1, 1984

[30] Foreign Application Priority Data

Aug. 8, 1983 [FR] France .................................. 83 13058
Jul. 16, 1984 [FR] France .................................. 84 11245

[51] Int. Cl.⁴ ........................ B65H 69/02; G02B 5/16
[52] U.S. Cl. ................................ 156/158; 156/304.2; 264/1.5; 350/96.21
[58] Field of Search ..................... 156/158, 159, 304.2, 156/304 B; 264/1.5, 1.6; 350/96.21

[56] References Cited

U.S. PATENT DOCUMENTS

| | | | |
|---|---|---|---|
| 3,912,574 | 10/1975 | Cherin et al. ..................... | 350/96.21 |
| 4,088,386 | 5/1978 | Hawk .............................. | 350/96.21 |
| 4,109,369 | 8/1978 | Taylor ............................ | 156/158 |
| 4,196,032 | 4/1980 | Eggleston ........................ | 156/304.3 |
| 4,227,951 | 10/1980 | Mignier ........................... | 156/158 |

OTHER PUBLICATIONS

Shigeru Kaihara, Patent Abstract of Japan, vol. 6, No. 168 (p. 139) (1046) Sep. 2, 1982.

*Primary Examiner*—Michael Ball
*Attorney, Agent, or Firm*—Dennison, Meserole, Pollack & Scheiner

[57] ABSTRACT

A support of soft material (4) has a fiber-receiving groove (5) in one of its surfaces (40). The groove is filled with a transparent setable liquid medium. A rigid link part (8) is pressed against the groove. Suitably prepared ends (11, 21) of two optical fibers (1,2) are inserted into the liquid-filled groove from opposite ends thereof. The medium is caused to set, and then the link part (8) is removed from the support. The optical fibers come away with the link part and the support mold is reusable. In a variant, the link part is stretched prior to gluing, and is allowed to return to its original length after the glue has set. This prestresses in the connection.

17 Claims, 19 Drawing Figures

METHOD OF CONNECTING OPTICAL FIBERS

The invention relates to connecting optical fibers.

BACKGROUND OF THE INVENTION

Optical fiber connectors are already known for connecting optical fibers. The present invention relates to a device of a different type which is intended, not to provide a connection between optical fibers which is releasable at will, but rather to provide a permanent interconnection between optical fibers. By analogy with electricity, the present invention may be considered as providing a kind of splice for optical fibers, whereas connectors are like plugs and receptacles.

In this respect, a first aim of the present invention is to provide connection means which are cheap and easy to use, and which are particularly applicable to the installation of a complete optical fiber teledistribution network, for example. In such a network, multi-fiber cables need to be connected together and also to be split up at junction or distribution cabinets for setting up the network and for modifying connections to various subscribers.

The invention also aims to solve the difficult problems of connecting fibers end-to-end in a simple manner, which problems are mainly due to the fragility and to the very small size of the fibers. Further, the present trend is towards a continuing reduction of the diameter of the central portion or "core" of optical fibers.

Another difficulty which the present invention aims to solve is the fact that the fibers to be connected may have very slightly different diameters due to the spread of manufacturing tolerances between fibers of different batches or origins. The quality of the connections made must remain substantially constant in spite of such variations.

To solve the above problems, the invention provides a method of connecting optical fibers after a preliminary step of preparing at least two optical fibers for connection.

SUMMARY OF THE INVENTION

In accordance with the invention, the method comprises the following steps:

(a) providing a support block having a surface which includes a fiber-receiving groove, with at least said grooved surface of the support block being made of a resiliently deformable material which is softer than the optical fibers;

(b) filling the fiber-receiving groove with a transparent setable liquid medium;

(c) providing a rigid link part having a polished surface, and applying the polished surface of the link part against the said grooved surface of the support block;

(d) inserting the ends of two optical fibers to be interconnected end-to-end into the said liquid-filled fiber-receiving groove;

(e) pressing the link part against the fibers, thereby inducing a radial reaction force from the groove walls on the fibers, thus aligning the fibers;

(f) causing the said liquid medium to set; and (g) separating the link part from the support block in such a manner that the link part comes away from the support block together with the two fibers in operative interconnection.

It has been observed that there exist glues which are capable of selectively adhering to optical fibers and to the rigid plate without adhering to the softer material of the support. Such a glue ensures that the fibers come away with the rigid link part when it is separated from the support block, and that they come away in operative interconnection. The support block has served as a mold or template for these operations. It may be reused for the same purpose.

To improve the temperature stability of the connection, it is preferable, during gluing, for the link part to be urged in a manner suitable for stretching the link part in the long direction of the fibers, which stretching is removed after the liquid medium has set, thereby prestressing the fibers.

In a preferred implementation of the invention, the link part is stretched by bending. The bending is advantageously performed by giving the support block a concave fiber-receiving surface and by pressing the link part against said surface.

It is particularly advantageous for a glue-filled gap to remain between the facing ends of the fibers being interconnected. Once the medium has set, this provides a cushion of glue which is capable of absorbing small compression and/or traction forces to which the fibers may be subjected by changes in temperature.

The invention also provides an optical fiber splice obtained by the above-defined method and which comprises at least one rigid link part together with two optical fibers which are operatively interconnected thereon by gluing by means of a transparent setable liquid medium.

BRIEF DESCRIPTION OF THE DRAWINGS

Implementations of the invention are described by way of example with reference to the accompanying drawings, in which.

MORE DETAILED DESCRIPTION

Optical fiber technology often makes use of specific shapes. The accompanying drawings are thus to be considered as an integral part of the present description capable of adding wherever necessary to the definition of the invention and to the sufficiency of its description.

FIGS. 1 to 12 make use of a common system of notation to define the two fibers being interconnected and the groove which guides them. The two fibers are generally referenced 1 and 2 and their prepared ends for interconnection are referenced 11 and 21. The point of contact between the two fiber ends is not shown, and it is not visible in practice.

As mentioned above, the method in accordance with the invention begins with a preliminary step in which the ends of the fibers are prepared for connection. To do this the plastic protective covering of the fibers is stripped from their ends, and the stripped end lengths of fiber are fractured in such a manner as to obtain end faces for interconnection which are plane, perpendicular to the fiber axis, and having a shiny mirror surface. Techniques for stripping the protective covering are well known to the person skilled in the art, and plane, perpendicular, mirror finish end faces can be obtained by applying the teaching of the Applicants' published French patent specification No. 2 422 604.

The method in accordance with the invention makes use of a support generally referenced 4 which is made of material which is softer than the material of the fibers and which is resiliently deformable. The support 4 has an upper surface designated 40 in which at least one fiber-receiving groove 5 is formed (FIG. 1).

Figure 8:
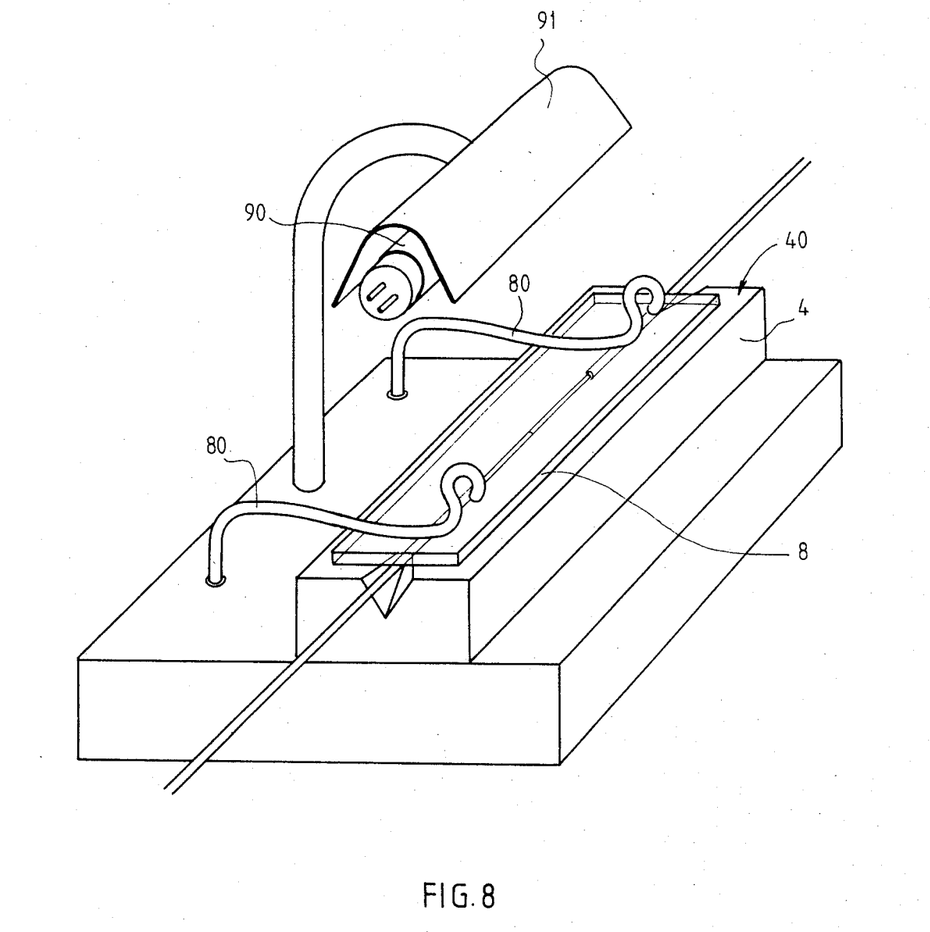
FIG. 8 is a diagrammatic perspective view showing a jig fitted with the various items needed to perform the invention.

Spring clamping means such as the spring clips 80 shown in FIG. 8 are used for pressing a rigid link part 8 against the grooved surface 40 of the support 4. The surface of the link part which is thus pressed against the support is a plane polished surface, and the link part 8 is in the form of a plate.

Figure 1:
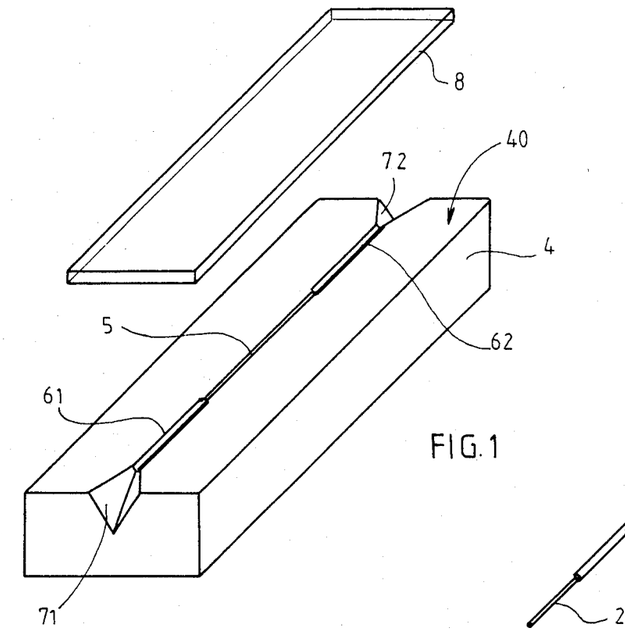
FIG. 1 is an exploded perspective diagram of a support block showing its groove and a transparent rigid link part.
Figure 2:
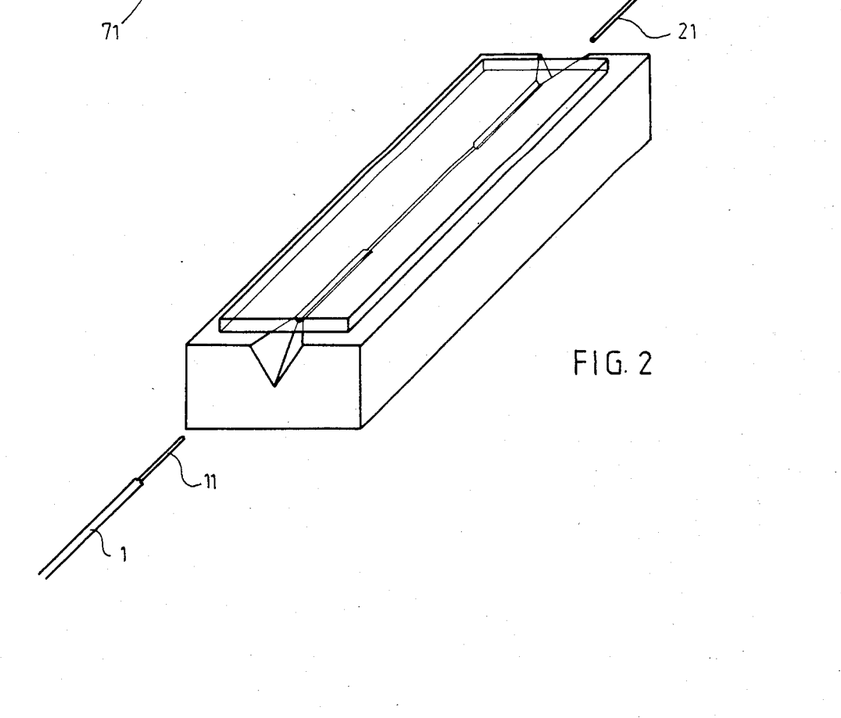
FIG. 2 is an exploded perspective diagram of the link part assembled against the support with the groove filled with transparent glue and with the two ends of two fibers to be connected end-to-end ready to be inserted into the grooves.
Figure 3:
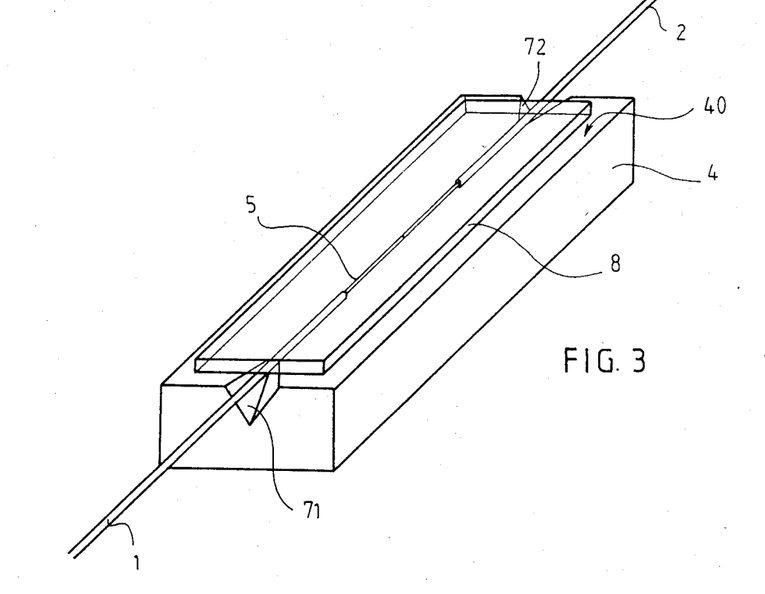
FIG. 3 is a perspective diagram showing the fibers inserted in the groove.
Figure 4:
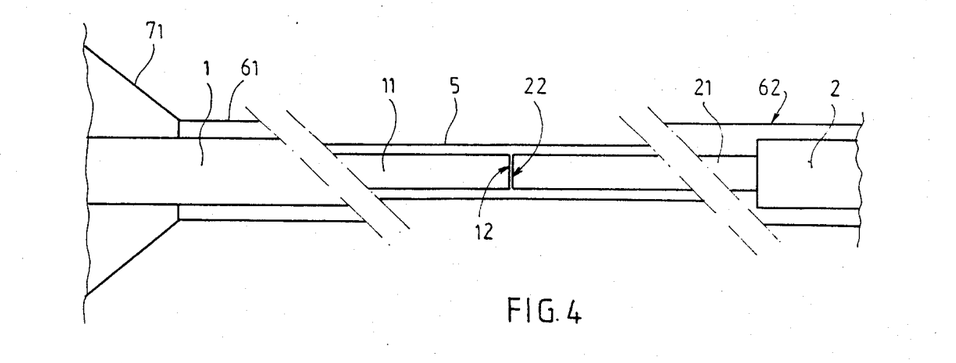
FIG. 4 is a diagrammatic plan view showing the fibers assembled end-to-end in the groove.
Figure 5:
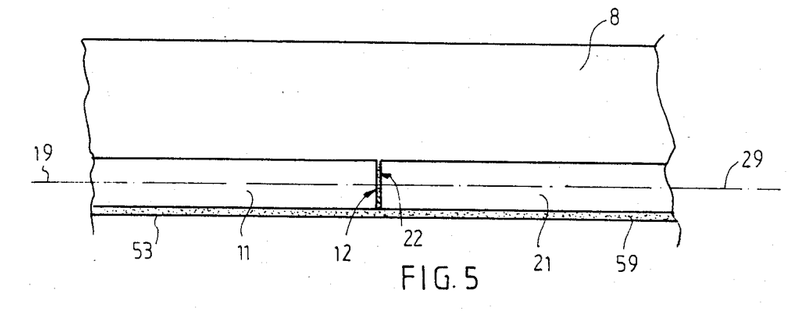
FIG. 5 is a vertical longitudinal section showing two fibers joined end-to-end in accordance with the invention.
Figure 6:
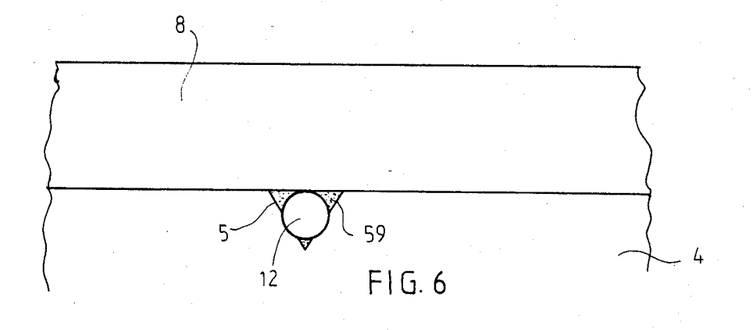
FIG. 6 is a cross section showing the link part pressing a fiber into the resilient walls of the groove.
Figure 7:
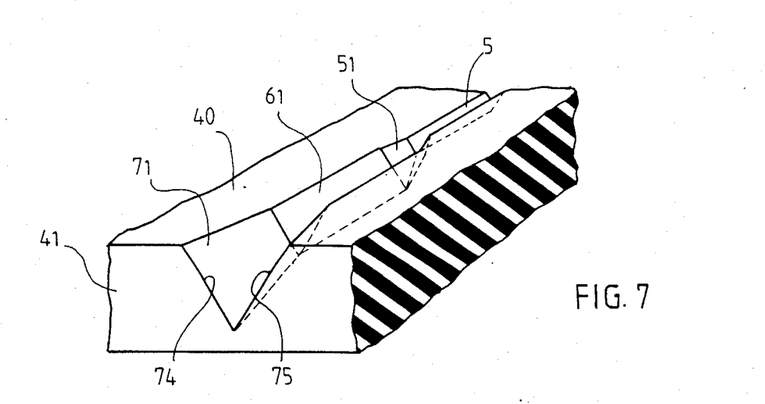
FIG. 7 is a perspective view of a portion of the soft support block or mold used for performing the invention.

The fiber-receiving groove 5 in the support 4 is of a complex shape which is best seen in FIGS. 1, 5 and 7.

The middle portion of the groove has a V-shaped cross section and serves to receive the prepared end portions of the two optical fibers. The reference 5 is used below to designate this V-shaped middle portion of the groove as a whole.

This middle portion 5 of the groove is partially visible in FIGS. 1 and 7. When closed by the plane plate 8, the middle portion 5 of the groove may be considered to form a prismatic bore having a cross section approximately in the form of an equilateral triangle. Other shapes could be devised for this middle portion, in particular its cross section could be in the shape of some other polygon and it may be symmetrical or asymmetrical about a longitudinal plane perpendicular to the face 40, all or part of the cross section may be curvilinear, and convex and/or concave portions may be included. The cross section could be entirely curvilinear.

The important feature of the middle portion 5 of the groove is that its shape applies balanced radial forces to the fiber to counteract the radial force due to the link part 8 being pressed thereagainst.

Both ends of the middle portion 5 of the groove run into intermediate portions of larger cross section which are in alignment with the middle portion and which are sized to fit the un-stripped fibers where they are still covered by their protective coverings. Thus, in FIGS. 1 and 4, these intermediate portions are referenced 61 and 62, while FIG. 7 shows the intermediate portion 61 in greater detail together with a flared transition portion 51 leading to the middle portion 5.

Finally, the end portions of the fiber-receiving groove in the support block 4 are in the form of larger flared or pyramid-shaped end portions 71 and 72 (see FIGS. 1 and 3) which are of V-shaped cross section having sloping sides 74 and 75 (see FIG. 7). These end portions are shaped to guide fiber ends being inserted into the groove, and they may have cross sections other than V-shaped, eg. they may be conical.

Before placing the plate 8 against the support 4, a suitable quantity of transparent setable liquid material is disposed in its groove(s). The setable material is advantageously chosen to act as a refractive index matcher.

The prepared ends 11 and 12 of the optical fibers 1 and 2 are then inserted into the groove from its opposite ends and they are advanced until their front faces 12 and 22 come into end-to-end contact.

The ends of the optical fibers are immersed in the setable liquid contained in the groove, so having a refractive index close to that of the silica of the glass fibers improves the transmission of light between the two fibers by attenuating index jumps in the separation diopters.

It has further been observed that the index-matching liquid medium also provides automatic cleaning of the zone between the facing ends (12 and 22) of the fibers (see FIG. 4) by virtue of the piston effect produced by inserting the two fibers into the groove 5 while it is closed by the plate 8.

The effect of pressing the rigid plate 8 against the support 4 of softer material is to apply pressure on the fibers in a direction perpendicular to the surface 40 of the support, thereby inducing a reaction which is applied to the fibers by the walls of the groove 5 pressing radially against them and thus aligning them.

The following step of the method consists in causing the liquid material to set. The plate 8 is preferably made of glass and the index adapting setable liquid is preferably a glue which sets when irradiated by radiation to which the plate 8 is transparent, eg. ultraviolet radiation.

As can be seen in FIG. 8, the step of setting the liquid material can then be simply performed by placing the groove 5 together with its intermediate and end portions under an ultraviolet lamp 90 so that ultraviolet radiation passes through the glass plate 8. A lamp-shade 91 is provided to protect the user.

The glass plate 8 can then be separated from the support 4 and the plate comes away together with the operatively interconnected fibers. It has been observed that a suitable choice of materials can prevent any adherence between the liquid material after setting and the soft material of the support 4.

FIG. 5 shows the final state of the plate 8 supporting the ends 11 and 21 of the fibers which are glued thereto by the index matching medium 59 once it has set. The optical axes 19 and 29 of the two fibers are accurately aligned. The reference 53 designates a "spine" of glue adhering to the fibers and molded by the bottom of the V-shaped groove.

Although other shapes can be devised for the support or mold 4, it is presently considered that the best shape for the support is generally prismatic with a generator line that is substantially parallel to the direction of the groove. The most advantageous implementation of the support is thus has the general shape of a rectangular parallelipiped, (which may be slightly curved in a manner described below).

A particular example of the invention is described in detail.

EXAMPLE 1

Two optical fibers of 125 μm diameter were prepared as described in the above-mentioned published French patent specification No. 2 422 604.

A parallelipiped block 4 of soft material was constructed from a silicone elastomer. The block was made by molding.

The groove provided in the block was of the shape shown in FIG. 7, including a V-shaped middle portion 5 with an angle of 60° between its flanks and a depth of 0.17 mm.

A few drops of a liquid glue that is polymerizes under the effect of ultraviolet radiation were placed in the middle portion 5 of the groove, in the intermediate portions 61 and 62 and in the end portions 71 and 72. A suitable glue is sold by the Loctite company under the name Glass Bond.

A 1 mm thick glass plate was then applied against the top surface 40 of the support 4.

The fibers were then inserted into respective ends of the groove until they came into close contact with each other. The quality of the contact may be observed by visual observation in situ using a binocular magnifier looking through the glass plate.

After a visual inspection, ultraviolet radiation from the lamp 90 (FIG. 8) was applied to the index matching liquid medium through the glass plate 8.

After the medium had set, the glass plate was removed from the mold support 4. It could be seen that the two optical fibers and the set index matching medium came away with the plate. The groove 5 in the mold 4, and in particular the side walls of the groove, were thus perfectly clean and ready to be used again for connecting two more optical fibers to each another and to another glass plate.

Figures 9, 10, 11:
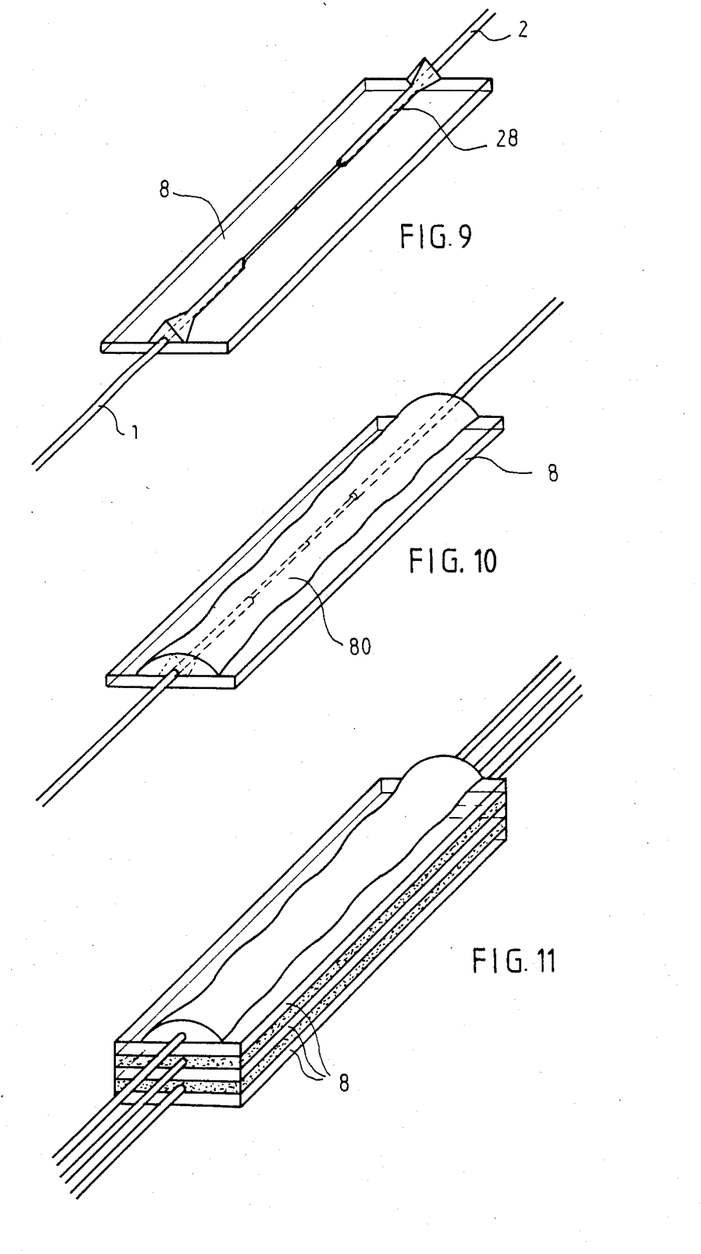
FIG. 9 is a perspective diagram showing a splice on an upturned link part after removal from the support block.
FIG. 10 shows a completed splice under the protection of a fillet of glue.
FIG. 11 is a perspective diagram of a glued stack of a plurality of splices in accordance with the invention.

The general shape of the optical splice obtained by implementing the method is shown in FIG. 9. There is the glass plate 8 on which the two optical fibers 1 and 2 are fixed by being buried in a prismatic shape 28 of triangular cross section which reproduces the shape of the groove.

Such an optical splice may be used in several different ways. The prismatic shape 28 may, for example, be buried in turn in resin 80 (see FIG. 10) thus protecting the splice as a whole. The splice can then be covered with various forms of plastic or metal protective cap or sleeve.

Many other variations may be envisaged, for example, several plates 8-1 to 8-n may be stacked in a "sandwich" and glued together with resin such as the resin 80, thereby constituting a multiple fiber splice with fibers 1-1 to 1-n being connected to respective fibers 2-1 to 2-n. A structure of this kind is shown diagrammatically in FIG. 11.

Figure 12:
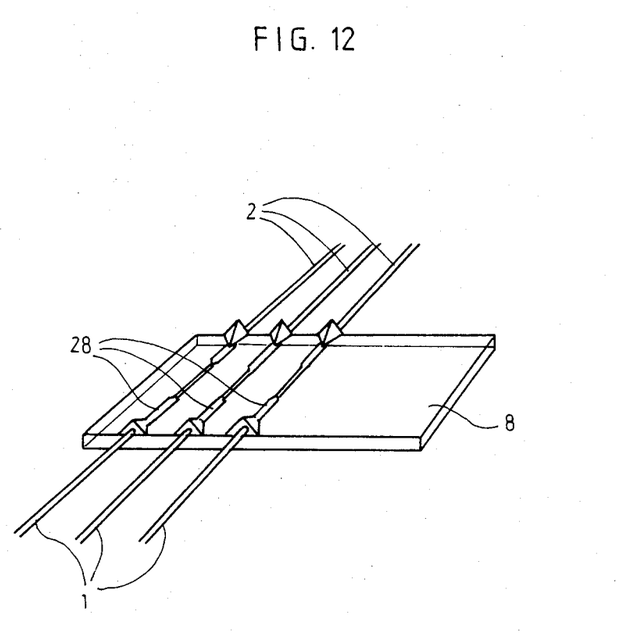
FIG. 12 is a perspective diagram showing a modification of the FIG. 9 splice in which a plurality of optical splices are formed on a single plate.

Another variant consists in making a plurality of splices on a single plate by means of a mold having a plurality of grooves. Such an arrangement is shown in FIG. 12.

In order to verify that the fibers are properly placed relative to each other and prior to setting the index matching medium, light radiation may be applied to the two fibers, either by injection from their ends or else by lateral injection through their envelopes. Such injection serves to produce a bright spot on the front faces 12 and 22 of the respective fibers. When the fibers are in good contact, the bright spot is considerably attenuated and may disappear entirely.

A variant consists in applying color to the side walls of the prepared end portions of the fibers as described in French Certificate of Addition application No. 83 06499. It is then easy to follow the path of a fiber colored in this manner along the groove 5.

In the above, the glue is described as being set by applying ultraviolet radiation thereto through a glass plate 8. Another simple variant would to be to provide a soft support or mold 4 which is itself transparent to ultraviolet radiation. This could be done by taking advantage of the fact that some silicone resins are transparent to ultraviolet. In such a case, the ultraviolet radiation could be applied through the support 4 and there would be no need for the plate 8 to be transparent as well. It could then be made of a material other than glass, eg. metal.

Other variants of the invention include selecting an index matching medium that is capable of setting under the influence of agents other than ultraviolet radiation.

Reference is made to FIGS. 13 to 19 which show a variant implementation of the method in accordance with the invention.

In FIGS. 13 to 19, the two optical fibers to be connected are referenced 201 and 202 and their ends prepared for connection are referenced 211 and 221.

This variant of the method begins with the same preliminary step of preparing the ends of the two fibers as indicated above.

Figure 13:
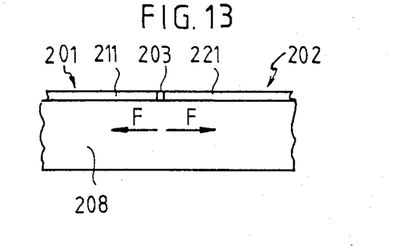
FIG. 13 is a diagrammatic side view of two optical fibers being glued end-to-end on a link part which is stretched in the long direction of the fibers.
Figure 14:
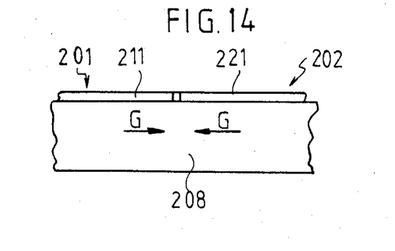
FIG. 14 shows the FIG. 13 fiber assembly after the link part stretching force has been removed.

The fundamental features of this variant of the method are described first with reference to FIGS. 13 and 14.

The ends 211 and 221 of the fibers as prepared for connection are glued end-to-end on a rigid member 208 which constitutes a link part. The glue is a transparent setable liquid medium which advantageously also constitutes an index matching medium. The link part is preferably in the form of a glass plate and the setable liquid medium is a glue that sets under the effect of radiation to which the plate is transparent, eg. ultraviolet radiation.

As shown in FIG. 13, during gluing, the link part 208 is subjected to forces tending to stretch it in the longitudinal direction of the optical fibers. This is shown diagrammatically by arrow F. Once the liquid medium has set and the ends of the fibers are glued to the link part 208, the forces are removed from the link part 208 which therefore tends to shorten, thus setting up a prestress as represented by arrows G in FIG. 14.

It is particularly advantageous to leave a gap 203 between the ends of the fibers during gluing. This gap should preferably be chosen to be shorter in the longitudinal direction than the diameter of the fibers. For example, the length of the gap may be chosen to be in the range one tenth of the diameter to one half of the diameter.

Thus, after the glue has set and the prestress has been established, there is a cushion of glue in the previously empty gap which is compressed by the prestress and which capable of absorbing small compressions or tractions applied to the optical fibers, eg. under the effects of temperature variations.

Figure 15:
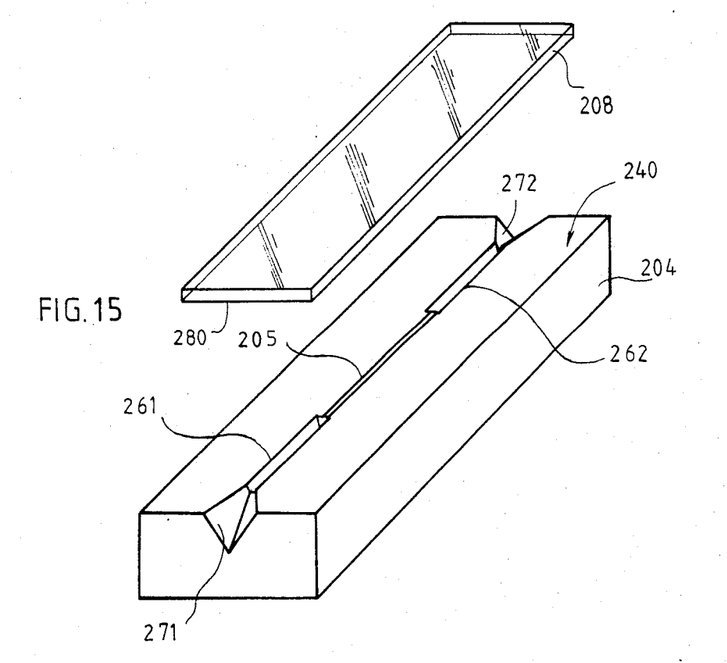
FIG. 15 is a perspective diagram showing a support block and a link part for performing the method in accordance with the invention.
Figure 16:
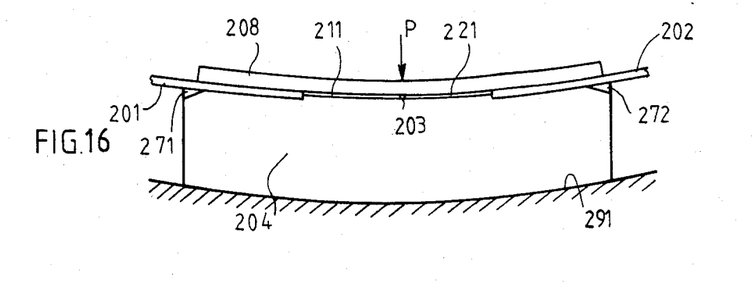
FIG. 16 is a side view showing how the FIG. 15 link part is bent against the FIG. 15 support block.

The force that stretches the link part 208 is preferably obtained by bending the link part as is shown in FIGS. 15 and 16.

The link part 208 is constituted by a glass plate having a bottom surface 281 intended for receiving the ends 211 and 221 of the optical fibers 201 and 202 which are glued thereto. The link part 208 is bent by pressing its bottom face 281 against the concave surface 240 of a support block 204. The support is made of a material which is softer than the optical fibers and which is resiliently deformable, eg. it may be made of elastomer. The surface 240 has at least one fiber-receiving groove 205 (see FIG. 15).

The support block 204 is made in the same general manner as described above, but its grooved surface 240 is made concave by deforming the support block.

Likewise, the groove 205 has the same general shape as the groove 5. In particular, a middle portion has a V-shaped cross section for receiving the prepared ends of the fibers. When the link part 308 is pressed against the support block 208 it closes the groove 205 (see FIG. 16) and the cross section of the closed groove is approximately an equilateral triangle. Naturally other shapes may be suitable for the middle portion of the groove 205 in the same manner as is described above in relation to the groove 5.

Each end of the middle portion 205 runs into a corresponding intermediate portion 261 or 262 of larger cross section suitable for receiving the optical fibers inside their respective protective coverings. Finally the ends of the groove 205 are flared at 271 and 272 which are genrally in the shape of a pyramid of V-shaped cross section.

Before pressing the link part 208 against the support 204, a sufficient quantity of transparent setable liquid medium is placed in the groove(s) thereof. The surface 280 of the link part 208 is then placed against the top surface 240 of the support block 204. This is done by applying pressure on a middle portion of the link part as shown diagrammatically by arrow P in FIG. 16. The prepared ends 211 and 221 of the optical fibers 201 and 202 are then inserted in the groove from its two ends in such a manner that the end faces of the fibers come into end-to-end contact. Even if it desired to provide a gap of suitable length between the end faces of the fibers, it is preferably to begin by putting the end faces into contact with each other and then to separate them by the chosen length.

The next step of the method consists in causing the liquid medium to set, and in preferred implementations of the invention this is done by means of ultraviolet radiation from a suitable ultraviolet lamp. Once the liquid has set, the force applied to the link part 208 is removed, ie. the bending force P is taken off the link part. As a result, the bottom surface 280 of the link part 208 which was previously bent to a convex shape tend to return to its initial plane shape. This prestresses the fibers glued thereto and tends to improve the contact between their end faces via the cushion of set glue.

Figure 17:
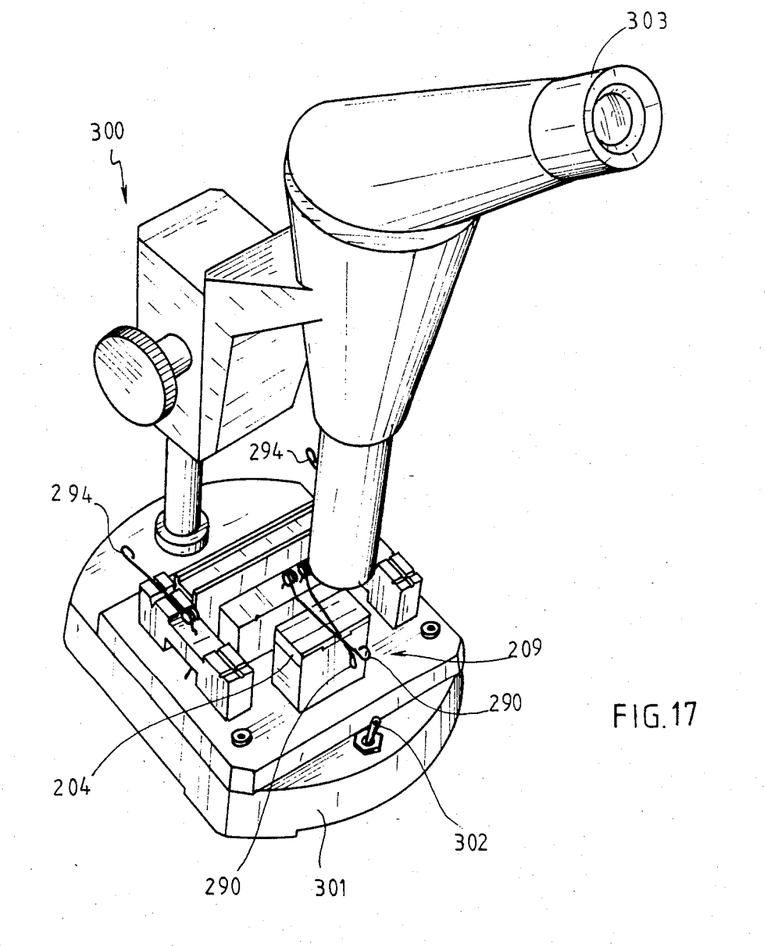
FIG. 17 is a perspective diagram showing a jig fitted with the various items needed to perform the invention together with a microscope for observing the connection operation.
Figure 18:
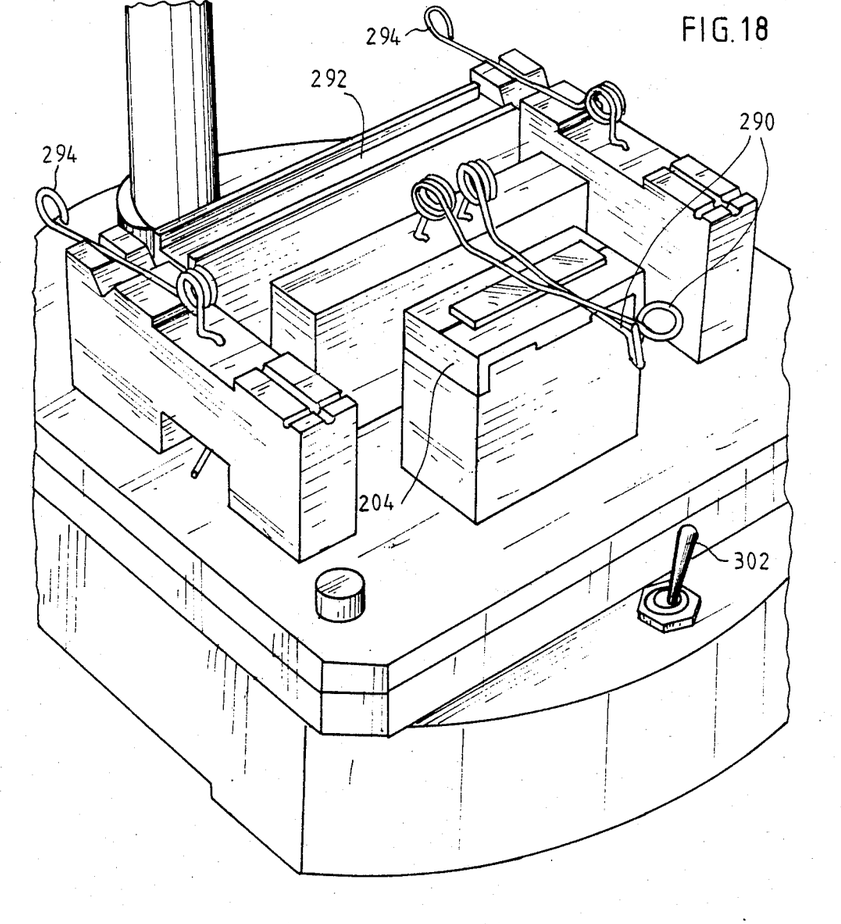
FIG. 18 is a perspective diagram on a larger scale of a portion of the jig shown in FIG. 17.

To perform this method, it is advantageous to use a jig 209 with the support block 204 fixed thereto, as shown in FIG. 17. The jig 209 is disposed on the stand 301 of a microscope 300 for observing the connection operation. To this end, the support block is made of a transparent material which illuminated by the microscope's light source. The light is controlled by a switch 302 provided on the microscope stand. The microscope 300 is fitted with a graduated cross-hair eyepiece 303 which for use in selecting the length of the gap between the facing ends of the fibers to be connected.

The jig 209 is additionally fitted with two spring clips 290 for applying the bending force to the middle portion of the link part 208 as it presses against the top surface 240 of the support block 204. The surface 240 is made concave by deforming the support block against a bearing surface 291 on the jig while the link part 208 is pressed thereagainst (FIG. 16).

Once the fibers to be connected have been inserted into the groove(s) of the support block, and the length of the, or each, gap between facing ends has been adjusted under microscopic examination, the transparent liquid medium is set by means of an ultraviolet lamp. To do this the microscope body is either removed completely from its stand or else it is turned round away from the jig, and an ultraviolet lamp is placed above the jig to set the setable medium. Once the medium has set, the spring clips 290 are released and the link part 208 together with the connected optical fibers is removed from the support 204.

Figure 19:
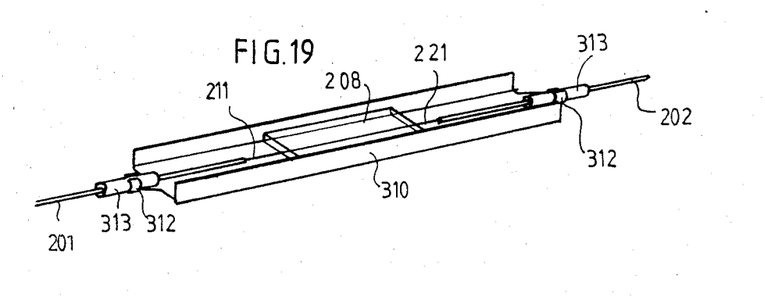
FIG. 19 shows an optical fiber splice in accordance with the invention disposed on a support strip.

The link part 208 and the optical fibers 201 and 202 may be placed on a strip 310 as shown in FIG. 19. The strip is in the form of an elongate metal body of channel section with a clamp 312 at each end for clamping to a respective optical fiber 201 or 202 via a rubber sleeve 313. The link part 208 has its face 280 glued to the bottom of the strip 310 while the optical fibers 201 and 202 are inserted in the sleeves 313 and then clamped in the clamps 312. The jig 209 has means suitable for enabling the link part and the two optical fibers to be inserted in the strip 310. These means are constituted by a horizontal groove 292 having an inside cross section that matches the outside cross section of the strip 310 and by two clamps 294 which are intended for holding the optical fibers while the link part 208 is being glued to the bottom of the strip 310.

There follows another example of a particular application of the invention.

EXAMPLE 2

Two 125 micron diameter optical fibers were prepared in the manner described in the above-mentioned published French patent specification No. 2 422 604.

A support block made of soft material such as a transparent silicone elastomer was used.

The groove provided in the block 204 has a middle portion 205 with the following dimensions: V shaped cross section with walls at 60°, depth 0.17 mm.

A few drops of liquid glue that polymerizes under ultraviolet radiation were inserted along the entire groove. A suitable glue is sold by the Loctite company under the name Glass Bond.

A 25 mm×5 mm×1 mm glass plate or slide was then applied thereto. The middle portion of the glass plate was pressed against the concave top surface of the support block by clamping means suitable for applying a force of 300 to 400 grams. The two fibers to be connected were then inserted via the two ends of the groove until their end faces came into end-to-end contact. The end faces were then separated by a distance of 12 to 40 microns under microscope observation.

After the glue had set, the link part was removed from the support taking with it the two optical fibers together with the set liquid material. The resulting assembly was then glued and fixed to a metal strip as shown in FIG. 19.

Other variants of the prestressed method can be devised in the same manner as is described with respect to possible variants of the arrangement shown in FIGS. 1 to 12.

I claim:

1. A method of connecting optical fibers, the method including a preliminary step of preparing at least two optical fiber ends for interconnection, and then comprising the following steps:
   (a) providing a support block having a surface which includes a fiber-receiving groove, with at least said grooved surface of the support block being made of a resiliently deformable material which is softer than the optical fibers;
   (b) filling the fiber-receiving groove with a transparent setable liquid medium;
   (c) providing a rigid link part having a flat polished surface, and applying the polished surface of the link part against the said grooved surface of the support block;
   (d) inserting the ends of two optical fibers to be interconnected end-to-end into the said liquid-filled fiber-receiving groove;
   (e) pressing the link part against the fibers, thereby inducing a radial reaction force from the groove walls on the fibers, thus aligning the fibers;
   (f) causing the said liquid medium to set and join the fibers to the link part; and
   (g) separating the link part from the support block in such a manner that the link part comes away from the support block together with the two fibers in operative interconnection.

2. A method according to claim 1, wherein the transparent medium sets when irradiated by radiation to which the support block or the link part is transparent, and in particular ultraviolet radiation.

3. A method according to claim 1, wherein the support block is generally prismatic in shape having a generator line running substantially parallel to the groove direction.

4. A method according to claim 1, wherein the groove includes a middle portion having a cross section suitable for receiving a prepared optical fiber, and having intermediate portions at either end of the middle portion which are in alignment therewith and which are of larger cross section suitable for receiving an optical fiber in a protective covering.

5. A method according to claim 4, wherein the outer ends of the said intermediate portions run into flared end portions.

6. A method according to claim 1, wherein the groove is of V-shaped cross section.

7. A method according to claim 1, wherein the support block includes a plurality of grooves.

8. A method according to claim 1, wherein, during setting of the liquid medium, the link part is subjected to forces in such a manner that it stretches in the fiber direction, said forces being removed after the liquid medium has set, thereby prestressing the connection.

9. A method according to claim 8, wherein the forces causing the link part to stretch consist in bending the link part.

10. A method according to claim 9, wherein the support block has a concave surface and wherein the link part is bent by pressing a surface of said part for receiving the optical fibers against the concave surface of the support block.

11. A method according to claim 10, wherein the support block is made of a material which is softer than the optical fibers and which is resiliently deformable, and wherein the concave surface of the support block is obtained by deforming the support block when the link part is pressed thereagainst.

12. A method according to claim 10, wherein the link part is pressed in a middle portion thereof.

13. A method according to claim 10, wherein the support block is made of material which is transparent and is illuminated by a light source.

14. A method according to claim 8, wherein, during setting of the liquid medium, a gap is left between the facing ends of the optical fibers, and wherein the gap is filled with the liquid medium.

15. A method according to claim 14, wherein the length of the gap is chosen to be in the range of one tenth to one half of the diameter of the optical fibers.

16. A method according to claim 14, wherein the ends of the optical fibers to be interconnected are initially brought into contact and are then separated to obtain a gap of the chosen length.

17. A method according to claim 1, wherein the transparent setable liquid medium serves as an index matching medium.

* * * * *